L. L. PITTMAN.
CUTTING MECHANISM FOR HARVESTERS.
APPLICATION FILED MAR. 26, 1913.

1,128,504.

Patented Feb. 16, 1915.
2 SHEETS—SHEET 2.

Witnesses

Inventor
L. L. Pittman,
By Victor J. Evans
Attorney

UNITED STATES PATENT OFFICE.

LAWSON L. PITTMAN, OF BLOOMFIELD, IOWA.

CUTTING MECHANISM FOR HARVESTERS.

1,128,504. Specification of Letters Patent. Patented Feb. 16, 1915.

Application filed March 26, 1913. Serial No. 756,928.

*To all whom it may concern:*

Be it known that I, LAWSON L. PITTMAN, a citizen of the United States, residing at Bloomfield, in the county of Davis and State of Iowa, have invented new and useful Improvements in Cutting Mechanism for Harvesters, of which the following is a specification.

The invention relates to corn harvesters and more particularly to the class of cutting mechanism for harvesting machines.

The primary object of the invention is the provision of a machine of this character wherein the cutting mechanism includes a pair of rotary cutting elements which are located with respect to each other to assure the positive cutting of standing stalks when the machine is advanced through a field and thereby obviating the clogging of the cutting mechanism or impeding of the advancement of the said machine.

Another object of the invention is the provision of a machine of this character wherein the rotary cutting elements are simultaneously driven from one of the supporting wheels of the machine, the cutting elements being formed with saw teeth so as to insure the severing of corn stalks without crushing or irregular cutting of the same during the advancement of the machine.

A still further object of the invention is the provision of a machine of this character the cutting mechanism of which is novel and will assure the positive cutting of the stalks when passing between the gathering arms of the machine, thus in this manner the draft of the machine is lightened.

A still further object of the invention is the provision of cutting mechanism of this character which is extremely simple in construction, thoroughly reliable and efficient in operation and inexpensive in manufacture.

With these and other objects in view the invention consists in the construction, combination and arrangement of parts as will be hereinafter more fully described, illustrated in the accompanying drawings, and pointed out in the claim hereunto appended.

Figure 1:
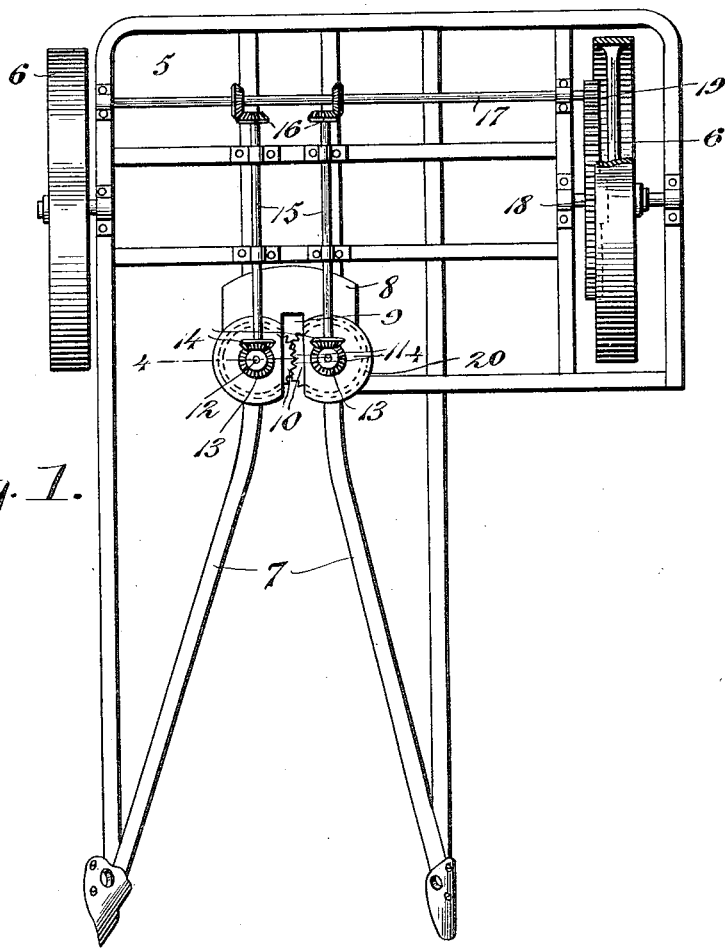
Figure 2:
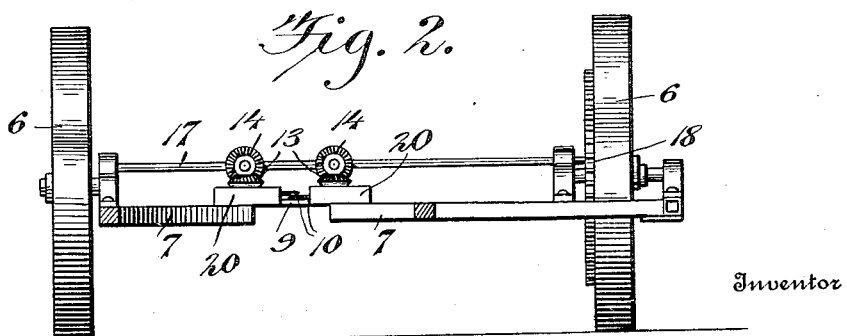
Figure 3:
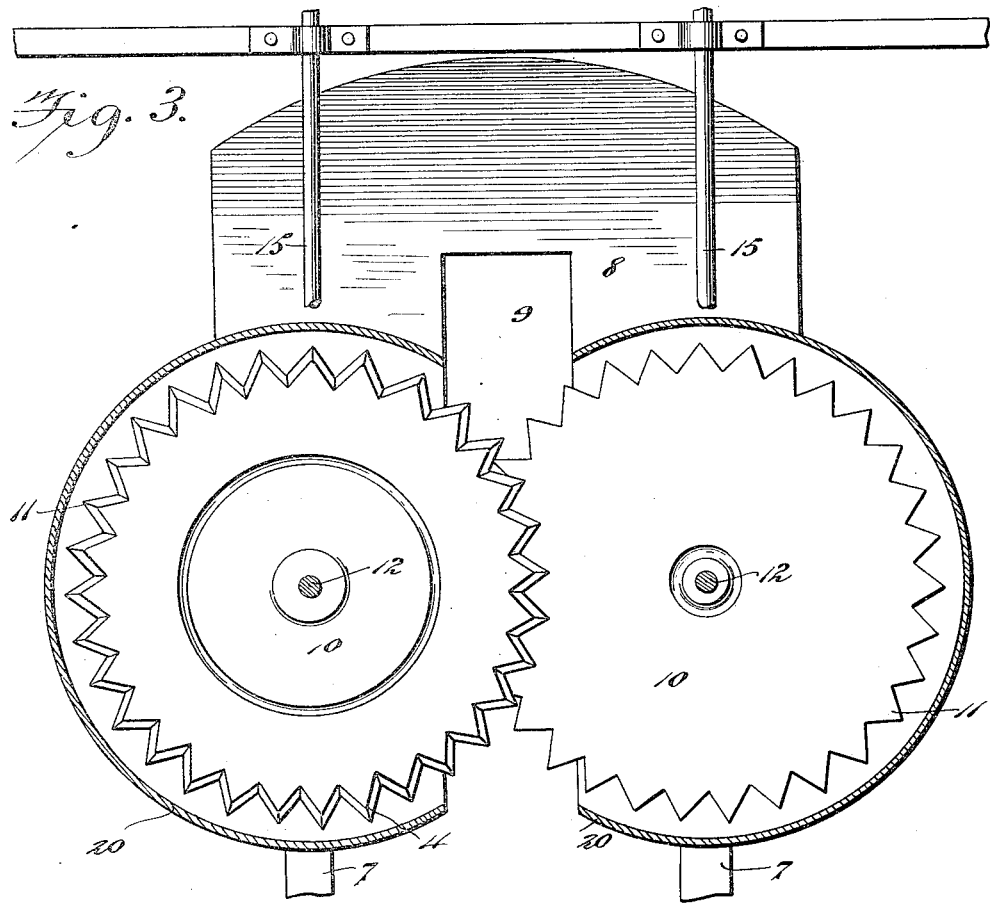
Figure 4:
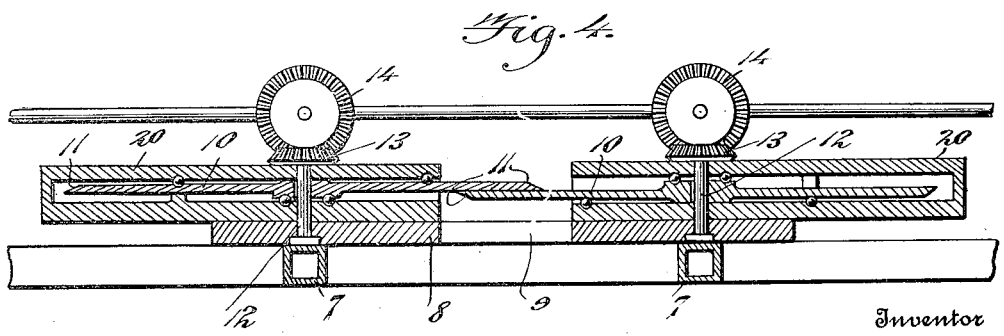

In the drawings: Figure 1 is a fragmentary top plan view of a corn harvester with the cutting mechanism constructed in accordance with the invention mounted thereon. Fig. 2 is a front elevation of the machine. Fig. 3 is a view similar to Fig. 1 with the casing of the cutting mechanism broken away. Fig. 4 is a sectional view on the line 4—4 of Fig. 1.

Similar reference characters indicate corresponding parts throughout the several views in the drawings.

Referring to the drawings by numerals 5 designates generally the main frame of the corn harvesting machine which is supported by the ground wheels 6, and has projecting therefrom forwardly diverging gathering arms 7, which are of the usual type whereby standing corn stalks will be gathered, so as to bring the same into alinement with the cutting mechanism presently described.

Mounted at the inner ends of the arms 7 is a bed plate 8 the same being formed with a slot 9 opening through the forward edge thereof and serving as a continuation of the space between the gathering arms 7 so as to permit the stalks to pass within the slot and this plate supports at opposite sides of the latter circular cutting blades 10 each being formed with peripheral saw teeth 11. The blades are positioned so as to extend over the slot and overlap each other at this point. The blades 10 are keyed upon rotatable stud spindles 12 which are mounted in the plate 8 and are formed on their upper ends with beveled pinions 13 the same meshing with beveled gears 14 fixed to counter-shafts 15 the same being suitably journaled upon the main frame and have connections as at 16 with a driven shaft 17, which is also suitably supported upon the main frame 5 of the machine.

Mounted on one of the ground wheels 6 concentric to the hub thereof is a cog gear 18 with which meshes a cog pinion 19, the same being fixed to the shaft 17, so that on advance of the machine motion is imparted from the said wheel 6 to the cutting blades 10 which are designed to rotate at uniform speed with respect to each other and on the standing stalks passing between the arms 7 and contacting with the blades 10 the latter will positively sever the stalk without impeding the forward draft of the machine.

Suitably mounted upon the bed plate 8 is a housing 20 which is designed to incase the blades 10 with the exception of the overlapped portions thereof at the point of the slot 9 of the bed plate, thus permitting the blades to act upon the standing stalks for severing the same during the forward travel of the machine through a field.

From the foregoing description taken in connection with the accompanying drawings, it is thought that the construction and operation of the invention will be clearly understood, and therefore, a more extended explanation has been omitted.

What is claimed is:

In a corn harvester, a frame having forwardly diverging gathering arms, a casing supported by the gathering arms at a point remote from the outer ends thereof and having a central bifurcation opening through the front edge, and circular chambers on opposite sides of said bifurcation, circular cutting disks journaled within the chambers and having their peripheries disposed in overlapping relation to each other and exposed within the bifurcation, saw teeth formed at the peripheries of the disks, bearing rollers spacing the disks from the walls of the chambers, and means for driving the disks in reverse directions to each other.

In testimony whereof I affix my signature in presence of two witnesses.

LAWSON L. PITTMAN.

Witnesses:
  C. W. RAMSEYER,
  F. C. CARY.

Copies of this patent may be obtained for five cents each, by addressing the "Commissioner of Patents, Washington, D. C."